US 12,251,866 B2

(12) United States Patent
Marumoto et al.

(10) Patent No.: US 12,251,866 B2
(45) Date of Patent: Mar. 18, 2025

(54) CONTROL METHOD OF INJECTION MOLDING MACHINE AND CONTROL DEVICE OF INJECTION MOLDING MACHINE

(71) Applicant: SUMITOMO HEAVY INDUSTRIES, LTD., Tokyo (JP)

(72) Inventors: Hirotsugu Marumoto, Chiba (JP); Masahiro Iwahashi, Chiba (JP); Yutaka Tsutsumi, Chiba (JP); Kazuya Hiraiwa, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/821,860

(22) Filed: Aug. 24, 2022

(65) Prior Publication Data

US 2023/0064024 A1 Mar. 2, 2023

(30) Foreign Application Priority Data

Aug. 26, 2021 (JP) ................................. 2021-138231

(51) Int. Cl.
*B29C 45/78* (2006.01)
*B29C 45/80* (2006.01)

(52) U.S. Cl.
CPC .............. *B29C 45/78* (2013.01); *B29C 45/80* (2013.01); *B29C 2945/7604* (2013.01); *B29C 2945/76107* (2013.01)

(58) Field of Classification Search
None
See application file for complete search history.

(56) References Cited

U.S. PATENT DOCUMENTS

| | | | | |
|---|---|---|---|---|
| 2005/0082707 | A1* | 4/2005 | Sabin | B29C 45/7686 425/166 |
| 2020/0078997 | A1 | 3/2020 | Higuchi et al. | |
| 2022/0063157 | A1* | 3/2022 | Jo | B29C 45/22 |
| 2023/0064024 | A1* | 3/2023 | Marumoto | B29C 45/78 |

FOREIGN PATENT DOCUMENTS

| | | |
|---|---|---|
| JP | H09-174602 | 7/1997 |
| JP | 2005-324483 | 11/2005 |
| JP | 2006-116735 | 5/2006 |
| JP | 2006116735 A * | 5/2006 |
| JP | 2010-030078 | 2/2010 |
| JP | 2020-037206 | 3/2020 |
| JP | 2020-040293 | 3/2020 |

* cited by examiner

*Primary Examiner* — Robert J Grun
(74) *Attorney, Agent, or Firm* — IPUSA, PLLC (57) ABSTRACT

A control method of an injection molding machine that molds a molding product including a skin layer and a core layer in a mold unit by injecting a molding material to the mold unit from a nozzle, the control method including controlling, at a starting time of an injection process, a temperature of the molding material used to form the skin layer so as to be higher than a temperature of the molding material used to form the core layer.

6 Claims, 8 Drawing Sheets

CONTROL METHOD OF INJECTION MOLDING MACHINE AND CONTROL DEVICE OF INJECTION MOLDING MACHINE

CROSS-REFERENCE TO RELATED APPLICATION

The present application is based on and claims priority under 35 U.S.C. § 119 to Japanese Patent Application No. 2021-138231, filed on Aug. 26, 2021, the contents of which are incorporated herein by reference in their entirety.

BACKGROUND

1. Technical Field

The present invention relates to a control method of an injection molding machine and a control device of an injection molding machine.

2. Description of the Related Art

A conventional injection nozzle fills a mold with molten resin. An injection nozzle includes a nozzle body part, a heater provided on the outer periphery of the nozzle body part, and a short, small protruding part having a small diameter provided on the tip of the nozzle body part. The short, small protruding part having a small diameter contacts the sprue bush of the mold to inject the molten resin.

SUMMARY

According to an embodiment of the present invention, there is provided a control method of an injection molding machine that molds a molding product including a skin layer and a core layer in a mold unit by injecting a molding material to the mold unit from a nozzle, the control method including controlling, at a starting time of an injection process, a temperature of the molding material used to form the skin layer so as to be higher than a temperature of the molding material used to form the core layer.

DETAILED DESCRIPTION

An injection molding machine molds a molding product in a mold unit by injecting the molding material from a nozzle to a mold unit. The injection molding machine repeatedly performs the operation of molding a molding product.

If the heating temperature of the nozzle is set low, the fluidity of the molding material is reduced, which reduces the filling property of filling the molding material into the mold unit and the transfer property of transferring a shape from the mold unit to the molding product.

On the other hand, if the heating temperature of the nozzle is set high, it takes time to solidify the molten molding material, which increases the molding cycle time.

One aspect of the present invention provides a technique that achieves the filling property and the transfer property, as well as the reduction of the molding cycle time.

Embodiments of the present invention will be described below with reference to the drawings. Identical or corresponding configurations in each drawing may be given the same symbols and explanations thereof may be omitted.

(Injection Molding Machine)

Figure 1:
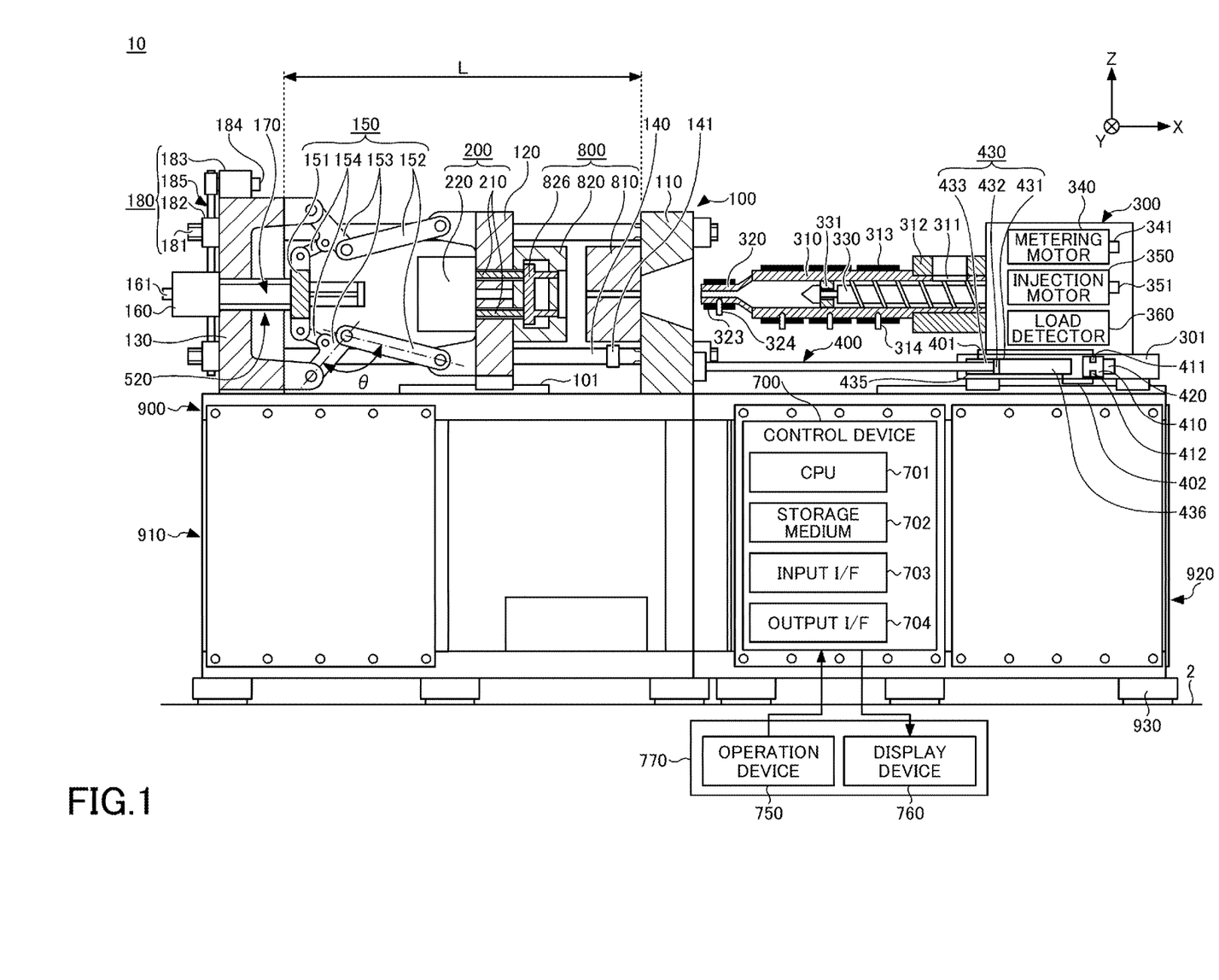
FIG. 1 illustrates the state of an injection molding machine according to an embodiment at the time of mold opening completion.
Figure 2:
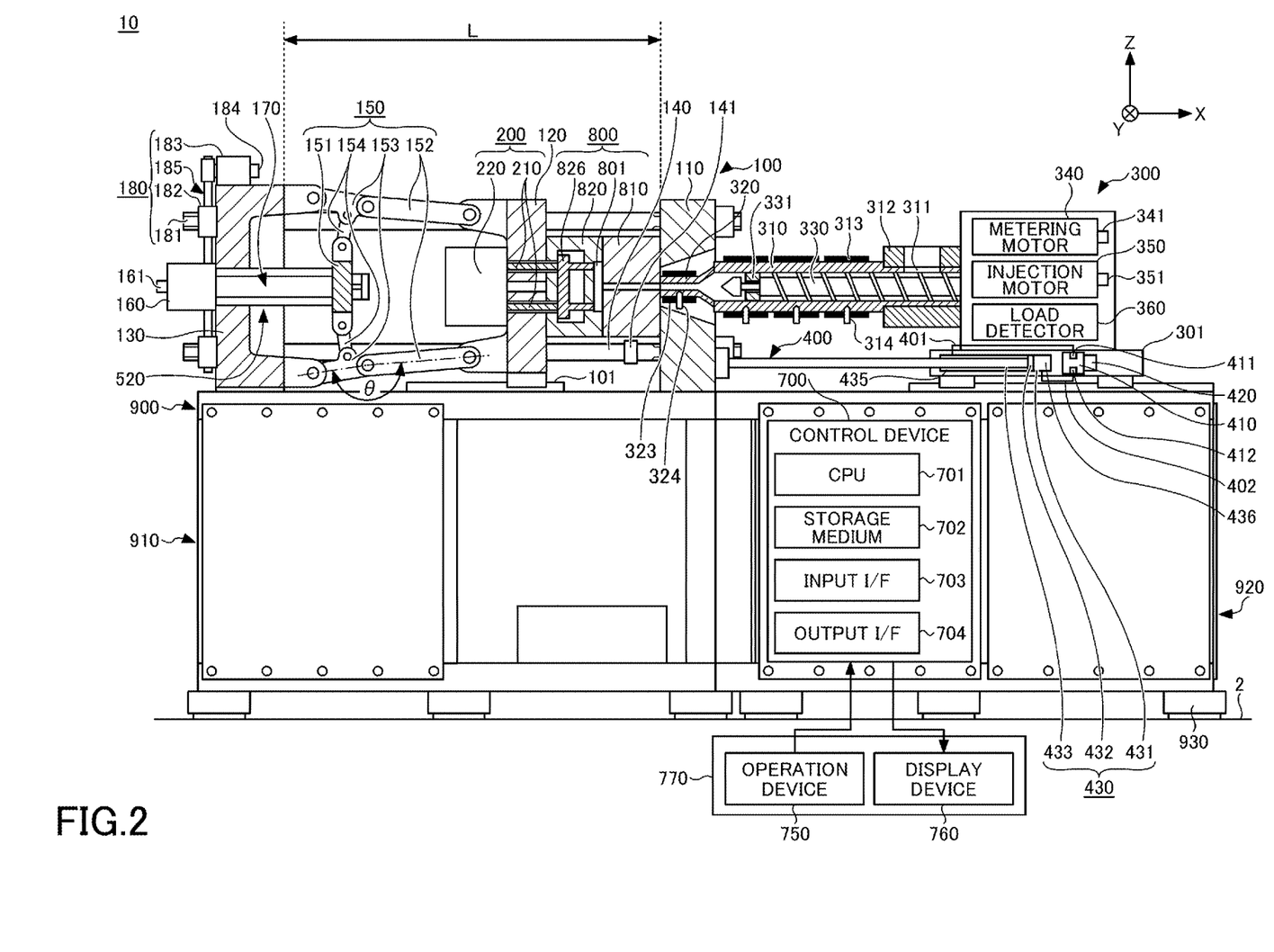
FIG. 2 illustrates the state of the injection molding machine according to an embodiment at the time of mold clamping.

FIG. 1 illustrates the state of the injection molding machine according to an embodiment at the time of mold opening completion. FIG. 2 is a diagram illustrating the state of the injection molding machine according to the embodiment at the time of mold clamping. In the present specification, the X-axis, Y-axis and Z-axis directions are perpendicular to each other. The X-axis direction and the Y-axis direction represent the horizontal direction, and the Z-axis direction represents the vertical direction. When a mold clamping unit 100 is horizontal, the X-axis direction is the mold opening and closing direction and the Y-axis direction is the width direction of an injection molding machine 10. The negative side in the Y-axis direction is referred to as "the operation side", and the positive side in the Y-axis direction is referred to as "the non-operation side".

As illustrated in FIGS. 1 and 2, the injection molding machine 10 includes the mold clamping unit 100 that opens and closes a mold unit 800, an ejector unit 200 that ejects the molding product formed by the mold unit 800, an injection unit 300 that injects the molding material into the mold unit 800, a moving unit 400 that moves the injection unit 300 forward and backward with respect to the mold unit 800, a control device 700 that controls each element of the injection molding machine 10, and a frame 900 that supports each element of the injection molding machine 10. The frame 900 includes a mold clamping unit frame 910 supporting the mold clamping unit 100 and an injection unit frame 920 supporting the injection unit 300. The mold clamping unit frame 910 and the injection unit frame 920 are respectively installed on a floor 2 via a leveling adjuster 930. The control device 700 is arranged in the internal space of the injection unit frame 920. Each element of the injection molding machine 10 is described below.

(Mold Clamping Unit)

In the explanation of the mold clamping unit 100, the moving direction of a movable platen 120 when the mold is closed (for example, the positive X-axis direction) is described as forward, and the moving direction of the movable platen 120 when the mold is opened (for example, the negative X-axis direction) is described as backward.

The mold clamping unit 100 closes, pressurizes (boosts the pressure), clamps, depressurizes, and opens the mold unit 800. The mold unit 800 includes a stationary mold 810 and a movable mold 820.

The mold clamping unit 100 is a horizontal type, for example, and the mold opening and closing direction is the horizontal direction. The mold clamping unit 100 has a stationary platen 110 to which the stationary mold 810 is attached, the movable platen 120 to which the movable mold 820 is attached, and a moving mechanism 102 for moving the movable platen 120 in the mold opening and closing direction with respect to the stationary platen 110.

The stationary platen 110 is fixed to the mold clamping unit frame 910. The stationary mold 810 is attached to the surface of the stationary platen 110 facing the movable platen 120.

The movable platen 120 is arranged so as to be movable in the mold opening and closing direction with respect to the mold clamping unit frame 910. On the mold clamping unit frame 910, a guide 101 is laid to guide the movable platen 120. The movable mold 820 is attached to the surface of the movable platen 120 facing the stationary platen 110.

The moving mechanism 102 moves the movable platen 120 forward and backward with respect to the stationary platen 110 to close, pressurize (boost the pressure), clamp, depressurize, and open the mold unit 800. The moving mechanism 102 includes a toggle support 130 spaced apart from the stationary platen 110, a tie bar 140 connecting the stationary platen 110 and the toggle support 130, a toggle mechanism 150 that moves the movable platen 120 in the mold opening and closing direction with respect to the toggle support 130, a mold clamping motor 160 that causes the toggle mechanism 150 to operate, a motion conversion mechanism 170 that converts the rotational motion of the mold clamping motor 160 into a linear motion, and a mold space adjustment mechanism 180 that adjusts the interval between the stationary platen 110 and the toggle support 130.

The toggle support 130 is spaced apart from the stationary platen 110 and is mounted on the mold clamping unit frame 910 so as to be movable in the mold opening and closing direction. Note that the toggle support 130 may be arranged so as to be movable along a guide laid on the mold clamping unit frame 910. The guide of the toggle support 130 may be the same as the guide 101 of the movable platen 120.

In the present embodiment, the stationary platen 110 is fixed to the mold clamping unit frame 910 and the toggle support 130 is arranged with respect to the mold clamping unit frame 910 so as to be movable in the mold opening and closing direction, but the toggle support 130 may be fixed to the mold clamping unit frame 910 and the stationary platen 110 may be arranged with respect to the mold clamping unit frame 910 so as to be movable in the mold opening and closing direction.

The tie bar 140 connects the stationary platen 110 and the toggle support 130 with an interval L in the mold opening and closing direction. Multiple tie bars 140 (e.g., 4) may be used. The multiple tie bars 140 are arranged parallel to the mold opening and closing direction and extend according to the mold clamping force. At least one tie bar 140 may be provided with a tie bar distortion detector 141 that detects the distortion of the tie bar 140. The tie bar distortion detector 141 sends a signal indicating the detection result thereof to the control device 700. The detection result of the tie bar distortion detector 141 is used for the detection of the mold clamping force, etc.

Although the tie bar distortion detector 141 is used as the mold clamping force detector for detecting the mold clamping force in the present embodiment, the present invention is not limited thereto. The mold clamping force detector is not limited to a distortion gauge type, but may be a piezoelectric type, a capacitive type, a hydraulic type, an electromagnetic type, etc., and the attachment position thereof is not limited to the tie bar 140.

The toggle mechanism 150 is arranged between the movable platen 120 and the toggle support 130 to move the movable platen 120 with respect to the toggle support 130 in the mold opening and closing direction. The toggle mechanism 150 includes a crosshead 151 that moves in the mold opening and closing direction and a pair of link groups that bend and stretch by the movement of the crosshead 151. The pair of link groups includes a first link 152 and a second link 153, which are flexibly connected by a pin or the like. The first link 152 is swingably attached to the movable platen 120 by a pin or the like. The second link 153 is swingably attached to the toggle support 130 by a pin or the like. The second link 153 is attached to the crosshead 151 via a third link 154. When the crosshead 151 is moved forward and backward with respect to the toggle support 130, the first link 152 and the second link 153 are extended and retracted, and the movable platen 120 moves forward and backward with respect to the toggle support 130.

The configuration of the toggle mechanism 150 is not limited to the configuration illustrated in FIGS. 1 and 2. For example, in FIGS. 1 and 2, the number of nodes in each link group is 5, but the number of nodes may be 4, and one end of the third link 154 may be connected to the node between the first link 152 and the second link 153.

The mold clamping motor 160 is attached to the toggle support 130 to cause the toggle mechanism 150 to operate. The mold clamping motor 160 extends and retracts the first link 152 and the second link 153 by moving the crosshead 151 forward and backward with respect to the toggle support 130, and moves the movable platen 120 forward and backward with respect to the toggle support 130. The mold clamping motor 160 is directly connected to the motion conversion mechanism 170, but may be connected to the motion conversion mechanism 170 via a belt, a pulley, etc.

The motion conversion mechanism 170 converts the rotational motion of the mold clamping motor 160 into a linear motion of the crosshead 151. The motion conversion mechanism 170 includes a screw shaft and a screw nut that screws into the screw shaft. A ball or a roller may be interposed between the screw shaft and the screw nut.

The mold clamping unit 100 performs a mold closing process, a pressure-boosting process, a mold clamping process, a pressure-releasing process, and a mold opening process under the control of the control device 700.

In the mold closing process, the mold clamping motor 160 is driven to advance the crosshead 151 to the mold closing completion position at a set moving speed, thereby advancing the movable platen 120 and causing the movable mold 820 to touch the stationary mold 810. The position and moving speed of the crosshead 151 are detected by using, for example, a mold clamping motor encoder 161. The mold clamping motor encoder 161 detects the rotation of the mold clamping motor 160 and sends a signal indicating the result of the detection to the control device 700.

The crosshead position detector for detecting the position of the crosshead 151 and the crosshead moving speed detector for detecting the moving speed of the crosshead 151 are not limited to the mold clamping motor encoder 161, but general detectors may be used. The movable platen position detector for detecting the position of the movable platen 120 and the movable platen moving speed detector for detecting the moving speed of the movable platen 120 are not limited to the mold clamping motor encoder 161, and general detectors may be used.

In the pressure-boosting process, the mold clamping force is generated by further driving the mold clamping motor 160 to further advance the crosshead 151 from the mold closing position to the mold clamping position.

In the mold clamping process, the mold clamping motor 160 is driven to maintain the position of the crosshead 151 at the mold clamping position. In the mold clamping process, the mold clamping force generated in the pressure-boosting process is maintained. In the mold clamping process, a cavity space 801 (see FIG. 2) is formed between the movable mold 820 and the stationary mold 810, and the injection unit 300 fills the cavity space 801 with a liquid molding material. The inserted molding material is solidified, resulting in a molding product.

The number of cavity spaces 801 may be one or more. In the latter case, several molding products are obtained simultaneously. An insert material may be placed in one part of the cavity space 801 and the other part of the cavity space 801 may be filled with a molding material. A molding product that integrates the insert material and the molding material may be obtained.

In the pressure-releasing process, the mold clamping motor 160 is driven to retract the crosshead 151 from the mold clamping position to the mold opening start position, thereby retracting the movable platen 120 and reducing the mold clamping force. The mold opening start position and the mold closing completion position may be the same position.

In the mold opening process, the mold clamping motor 160 is driven to retract the crosshead 151 from the mold opening start position to the mold opening completion position at a set moving speed, thus retracting the movable platen 120 and separating the movable mold 820 from the stationary mold 810. Subsequently, the ejector unit 200 ejects the molding product from the movable mold 820.

The setting conditions in the mold closing process, the pressure-boosting process, and the mold clamping process are collectively set as a series of setting conditions. For example, the moving speed and position (including the mold closing start position, the moving speed switching position, the mold closing completion position, and the mold clamping position) of the crosshead 151 and the mold clamping force in the mold closing process and the pressure-boosting process, are collectively set as a series of setting conditions. The mold closing start position, the moving speed switching position, the mold closing completion position, and the mold clamping position are arranged in the stated order from the back side toward the front side and represent the start point and the end point of the section where the moving speed is set. For each section, a moving speed is set. The moving speed switching position may be one or more. The moving speed switching position need not be set. Only one of either the mold clamping position or the mold clamping force may be set.

Setting conditions in the pressure-releasing process and the mold opening process are similarly set. For example, the moving speed and the position (the mold opening start position, the moving speed switching position, and the mold opening completion position) of the crosshead 151 in the pressure-releasing process and the mold opening process are collectively set as a series of setting conditions. The mold opening start position, the moving speed switching position, and the mold opening completion position are arranged in the stated order from the front side toward the back side and represent the start point and the end point of the section where the moving speed is set. For each section, a moving speed is set. The moving speed switching position may be one or more. The moving speed switching position need not be set. The mold opening start position and the mold closing completion position may be the same position. The mold opening completion position and the mold closing start position may be the same.

Instead of the moving speed and position of the crosshead 151, the moving speed and position of the movable platen 120 may be set. Instead of the position of the crosshead (e.g., mold clamping position) or the position of the movable platen, the mold clamping force may be set.

Incidentally, the toggle mechanism 150 amplifies the driving force of the mold clamping motor 160 and transmits the driving force to the movable platen 120. The amplification factor thereof is also referred to as "the toggle factor". The toggle factor varies according to the angle θ (hereinafter also referred to as a "link angle θ") formed by the first link 152 and the second link 153. The link angle θ is obtained from the position of the crosshead 151. When the link angle θ is 180 degrees, the toggle factor is at the maximum.

When the thickness of the mold unit 800 changes due to the replacement of the mold unit 800 or a change in the temperature of the mold unit 800, the mold space is adjusted so that a predetermined mold clamping force is obtained at the time of mold clamping. In the mold space adjustment, the interval L between the stationary platen 110 and the toggle support 130 is adjusted so that the link angle θ of the toggle mechanism 150 becomes a predetermined angle, for example, at the time of mold touch when the movable mold 820 touches the stationary mold 810.

The mold clamping unit 100 includes a mold space adjustment mechanism 180. The mold space adjustment mechanism 180 adjusts the interval L between the stationary platen 110 and the toggle support 130 to adjust the mold space. The timing when the mold space adjustment is performed is, for example, between the end of a molding cycle and the start of the next molding cycle. The mold space adjustment mechanism 180 includes, for example, a screw shaft 181 formed at the rear end of the tie bar 140, a screw nut 182 held rotatably but not movable back and forth by the toggle support 130, and a mold space adjustment motor 183 for rotating the screw nut 182 screwed to the screw shaft 181.

The screw shaft 181 and the screw nut 182 are provided for each tie bar 140. The rotational driving force of the mold space adjustment motor 183 may be transmitted to multiple screw nuts 182 via a rotational driving force transmitting unit 185. Multiple screw nuts 182 can be rotated synchronously. By changing the transmission path of the rotational driving force transmitting unit 185, it is also possible to rotate each of the multiple screw nuts 182 individually.

The rotational driving force transmitting unit 185 is configured by, for example, gears. In this case, a driven gear is formed on the outer circumference of each screw nut 182, a driving gear is attached to the output shaft of the mold space adjustment motor 183, and a plurality of driven gears and an intermediate gear meshing with a driving gear are held rotatably at the center of the toggle support 130. The rotational driving force transmitting unit 185 may be configured by a belt, a pulley or the like instead of a gear.

The operation of the mold space adjustment mechanism 180 is controlled by the control device 700. The control device 700 drives the mold space adjustment motor 183 to rotate the screw nut 182. As a result, the position of the toggle support 130 with respect to the tie bar 140 is adjusted and the interval L between the stationary platen 110 and the toggle support 130 is adjusted. Multiple mold space adjustment mechanisms may be used in combination.

The interval L is detected by using a mold space adjustment motor encoder 184. The mold space adjustment motor encoder 184 detects the rotation amount and the rotation direction of the mold space adjustment motor 183 and sends a signal indicating the result of the detection to the control device 700. The detection result of the mold space adjustment motor encoder 184 is used to monitor and control the position and the interval L of the toggle support 130. Note that the toggle support position detector for detecting the position of the toggle support 130 and the interval detector for detecting the interval L are not limited to the mold space adjustment motor encoder 184 and general detectors can be used.

The mold clamping unit 100 may have a mold temperature controller to adjust the temperature of the mold unit 800. Inside the mold unit 800, there is a flow path for a temperature control medium. The mold temperature controller adjusts the temperature of the mold unit 800 by adjusting the temperature of a temperature control medium supplied to the flow path of the mold unit 800.

The mold clamping unit 100 of the present embodiment is a horizontal type with the mold opening and closing direction in the horizontal direction, but the mold clamping unit 100 may be a vertical type with the mold opening and closing direction in the vertical direction.

The mold clamping unit 100 of the present embodiment has the mold clamping motor 160 as a driving source, but the mold clamping unit 100 may have a hydraulic cylinder instead of the mold clamping motor 160. The mold clamping unit 100 may include a linear motor for mold opening and closing and an electromagnet for mold clamping.

(Ejector Unit)

In the description of the ejector unit 200, as in the description of the mold clamping unit 100, the moving direction of the movable platen 120 when the mold is closed (for example, the positive X-axis direction) is described as forward, and the moving direction of the movable platen 120 when the mold is opened (for example, the negative X-axis direction) is described as backward.

The ejector unit 200 is attached to the movable platen 120 and moves back and forth together with the movable platen 120. The ejector unit 200 has an ejector rod 210 that ejects the molding product from the mold unit 800 and a driving mechanism 220 that moves the ejector rod 210 in the moving direction (X-axis direction) of the movable platen 120.

The ejector rod 210 is arranged so as to be movable back and forth in a through hole of the movable platen 120. The front end of the ejector rod 210 contacts an ejector plate 826 of the movable mold 820. The front end of the ejector rod 210 may or may not be connected to the ejector plate 826.

The driving mechanism 220 includes, for example, an ejector motor and a motion conversion mechanism that converts the rotational motion of the ejector motor into the linear motion of the ejector rod 210. The motion conversion mechanism includes a screw shaft and a screw nut that screws into the screw shaft. A ball or roller may be interposed between the screw shaft and the screw nut.

The ejector unit 200 performs the ejection process under the control of the control device 700. In the ejection process, the ejector rod 210 is advanced from the standby position to the ejection position at a set moving speed, to advance the ejector plate 826, and eject the molding product. Subsequently, the ejector motor is driven to retract the ejector rod 210 at a set moving speed and the ejector plate 826 is retracted to the original standby position.

The position and the moving speed of the ejector rod 210 are detected by using, for example, an ejector motor encoder. The ejector motor encoder detects the rotation of the ejector motor and sends a signal indicating the result of the detection to the control device 700. The ejector rod position detector for detecting the position of the ejector rod 210 and the ejector rod moving speed detector for detecting the moving speed of the ejector rod 210 are not limited to an ejector motor encoder, but general detectors can be used.

(Injection Unit)

In the description of the injection unit 300, unlike the description of the mold clamping unit 100 and the description of the ejector unit 200, the moving direction of a screw 330 during filling (for example, the negative X-axis direction) is described as forward and the moving direction of the screw 330 during metering (for example, the positive X-axis direction) is described as backward.

The injection unit 300 is installed on a slide base 301, and the slide base 301 is arranged so as to be movable back and forth with respect to the injection unit frame 920. The injection unit 300 is arranged so as to be movable back and forth with respect to the mold unit 800. The injection unit 300 touches the mold unit 800 and fills the molding material in the cavity space 801. The injection unit 300 includes, for example, a cylinder 310 that heats the molding material, a nozzle 320 provided at the front end of the cylinder 310, the screw 330 that is arranged in the cylinder 310 so as to be movable back and forth and rotatable, a metering motor 340 that rotates the screw 330, an injection motor 350 that moves the screw 330 forward and backward, and a load detector 360 that detects the load transmitted between the injection motor 350 and the screw 330.

The cylinder 310 heats the molding material supplied inside from a feed port 311. The molding material includes, for example, resin. The molding material is formed, for example, in the form of a pellet and is supplied to the feed port 311 in a solid state. The feed port 311 is formed at the rear of the cylinder 310. A cooler 312, such as a water-cooling cylinder, is provided on the outer periphery at the rear of the cylinder 310. In front of the cooler 312, the outer circumference of the cylinder 310 is provided with a first heater 313 such as a band heater and a first temperature detector 314.

The cylinder 310 is divided into multiple zones in the axial direction (e.g., X-axis direction) of the cylinder 310. Each of the multiple zones is provided with the first heater 313 and the first temperature detector 314. A set temperature is set in each of the multiple zones, and the control device 700 controls the first heater 313 so that the temperature detected by the first temperature detector 314 becomes the set temperature.

The nozzle 320 is provided at the front end of the cylinder 310 and is pressed against the mold unit 800. A second heater 323 and a second temperature detector 324 are provided on the outer periphery of the nozzle 320. The control device 700 controls the second heater 323 so that the detected temperature of the nozzle 320 becomes the set temperature.

The screw 330 is arranged so as to be rotatable and movable back and forth in the cylinder 310. As the screw 330 is rotated, the molding material is sent forward along the spiral groove of the screw 330. The molding material is gradually melted by heat from the cylinder 310 while being sent forward. As the liquid molding material is sent to the front of the screw 330 and accumulated at the front of the cylinder 310, the screw 330 is retracted. Subsequently, when the screw 330 is advanced, the liquid molding material accumulated in front of the screw 330 is injected from the nozzle 320 and is filled into the mold unit 800.

A backflow prevention ring 331 is attached to the front of the screw 330, so as to be movable back and forth, as a backflow prevention valve to prevent the backflow of the molding material from the front to the rear of the screw 330 when the screw 330 is pushed forward.

As the screw 330 is advanced, the backflow prevention ring 331 is pushed backward by the pressure of the molding material in front of the screw 330 and retreats relative to the screw 330 to a blocking position (see FIG. 2) that blocks the flow path of the molding material. This prevents the molding material accumulated in front of the screw 330 from flowing backward.

On the other hand, when the screw 330 is rotated, the backflow prevention ring 331 is pushed forward by the pressure of the molding material sent forward along the spiral groove of the screw 330 and is advanced relative to the screw 330 to an open position (see FIG. 1) that opens the flow path of the molding material. This sends the molding material to the front of the screw 330.

The backflow prevention ring 331 may be either a co-rotating type that rotates together with the screw 330 or a non-co-rotating type that does not rotate with the screw 330.

The injection unit 300 may include a driving source that moves the backflow prevention ring 331 back and forth with respect to the screw 330 between the open position and the closed position.

The metering motor 340 rotates the screw 330. The driving source for rotating the screw 330 is not limited to the metering motor 340, but may be, for example, a hydraulic pump.

An injection motor 350 moves the screw 330 back and forth. Between the injection motor 350 and the screw 330, a motion conversion mechanism or the like is provided to convert the rotational motion of the injection motor 350 into the linear motion of the screw 330. The motion conversion mechanism includes, for example, a screw shaft and a screw nut that screws into the screw shaft. A ball, roller or the like may be provided between the screw shaft and the screw nut. The driving source for moving the screw 330 forward and backward is not limited to the injection motor 350, but may be, for example, a hydraulic cylinder.

The load detector 360 detects the load transmitted between the injection motor 350 and the screw 330. The detected load is converted to pressure by the control device 700. A load detector 360 is provided in the transmission path of the load between the injection motor 350 and the screw 330 to detect the load acting on the load detector 360.

The load detector 360 sends a signal of the detected load to the control device 700. The load detected by the load detector 360 is converted into the pressure acting between the screw 330 and the molding material and is used to control and monitor the pressure that the screw 330 receives from the molding material, the back pressure against the screw 330, the pressure acting on the molding material from the screw 330, and the like.

The pressure detector for detecting the pressure of the molding material is not limited to the load detector 360, but a general pressure detector can be used. For example, a nozzle pressure sensor or a mold internal pressure sensor may be used. A nozzle pressure sensor will be installed in the nozzle 320. The mold internal pressure sensor will be installed inside the mold unit 800.

The injection unit 300 performs a metering process, a filling process, a hold pressure process, etc., under the control of the control device 700. The filling process and the hold pressure process may be collectively referred to as "the injection process".

In the metering process, the metering motor 340 is driven to rotate the screw 330 at a set rotational speed and feed the molding material forward along the spiral groove of the screw 330. Accordingly, the molding material is gradually melted. As the liquid molding material is sent in front of the screw 330 and accumulated at the front of the cylinder 310, the screw 330 is retracted. The rotational speed of the screw 330 is detected by using, for example, a metering motor encoder 341. The metering motor encoder 341 detects the rotation rotation of the metering motor 340 and sends a signal indicating the detection result to the control device 700. The screw rotational speed detector for detecting the rotational speed of the screw 330 is not limited to the metering motor encoder 341, and general detectors can be used.

In the metering process, a set back pressure may be applied to the screw 330 by driving the injection motor 350 to limit the sudden retraction of the screw 330. The back pressure against the screw 330 is detected by using, for example, the load detector 360. When the screw 330 is retracted to the metering completion position and a predetermined amount of molding material accumulates in front of the screw 330, the metering process is completed.

The position and rotational speed of the screw 330 in the metering process are set together as a series of setting conditions. For example, a metering start position, a rotational speed switching position, and a metering completion position are set. These positions are arranged in the stated order from the front to the back and represent the start point and an end point of a section for which the rotational speed is set. For each section, a rotational speed is set. One or more rotational speed switching positions may be provided. The rotational speed switching position need not be set. Also, back pressure is set for each section.

In the filling process, the injection motor 350 is driven to advance the screw 330 at a set moving speed, and the liquid molding material accumulated in front of the screw 330 is filled into the cavity space 801 in the mold unit 800. The position and moving speed of the screw 330 are detected by using, for example, an injection motor encoder 351. The injection motor encoder 351 detects the rotation of the injection motor 350 and sends a signal indicating the result of the detection to the control device 700. When the position of the screw 330 reaches the set position, switching (what is termed as V/P switching) from the filling process to the hold pressure process is performed. The position where the V/P switching is performed is referred to as "the V/P switching position". The set moving speed of the screw 330 may be changed according to the position of the screw 330, time, etc.

The position and moving speed of the screw 330 in the filling process are set together as a series of setting conditions. For example, a filling start position (also referred to as "the injection start position"), a moving speed switching position, and a V/P switching position are set. These positions are arranged in the stated order from the back to the front and represent the start point and the end point of the section in which the moving speed is set. For each section, a moving speed is set. The moving speed switching position may be one or more. The moving speed switching position need not be set.

For each section where the moving speed of the screw 330 is set, an upper limit of the pressure of the screw 330 is set. The pressure of the screw 330 is detected by the load detector 360. If the pressure of the screw 330 is less than or equal to the set pressure, the screw 330 is advanced at the set moving speed. On the other hand, if the pressure of the screw 330 exceeds the set pressure, the screw 330 is advanced at a slower moving speed than the set moving speed so that the pressure of the screw 330 is less than or equal to the set pressure, for the purpose of mold protection.

After the position of the screw 330 reaches the V/P switching position in the filling process, the screw 330 may be temporarily stopped at the V/P switching position, and then the V/P switching may be performed. Immediately before the V/P switching, a slow forward or slow backward movement of the screw 330 may be performed instead of stopping the screw 330. Moreover, the screw position detector for detecting the position of the screw 330 and the screw moving speed detector for detecting the moving speed of the screw 330 are not limited to the injection motor encoder 351, and general detectors can be used.

During the hold pressure process, the injection motor 350 is driven to push the screw 330 forward, keeping the pressure of the molding material at the front end of the screw 330 (hereafter, also referred to as "holding pressure") at a set pressure, and pushing the remaining molding material in the cylinder 310 toward the mold unit 800. The amount of molding material that is deficient due to cooling and contracting in the mold unit 800 can be replenished. The holding pressure is detected by using, for example, the load detector 360. The set value of the holding pressure may be changed according to the elapsed time from the start of the hold pressure process, etc. The holding pressure in the hold pressure process and the time for holding the holding pressure may be set multiple times, respectively, and may be set together as a series of setting conditions.

During the hold pressure process, the molding material in the cavity space 801 in the mold unit 800 is gradually cooled, and upon completion of the hold pressure process, the inlet of the cavity space 801 is blocked by the solidified molding material. This state is referred to as "a gate seal" and prevents backflow of the molding material from the cavity space 801. After the hold pressure process, a cooling process is initiated. The cooling process involves solidifying the molding material in the cavity space 801. The metering process may be performed during the cooling process for the purpose of shortening the molding cycle time.

The injection unit 300 of the present embodiment is an in-line screw system, but a preplasticizing system or the like may be used. The injection unit of the preplasticizing system supplies an injection cylinder with the molding material melted in the plasticizing cylinder, and the injection cylinder injects the molding material into a mold unit. Within the plasticizing cylinder, a screw is arranged so as to be rotatable and not movable back and forth, or the screw is arranged so as to be rotatable and movable back and forth. On the other hand, in the injection cylinder, a plunger is arranged so as to be movable back and forth.

Further, the injection unit 300 of the present embodiment is a horizontal type in which the axial direction of the cylinder 310 is horizontal, but may be a vertical type in which the axial direction of the cylinder 310 is vertical. The mold clamping unit combined with the vertical injection unit 300 may be either vertical or horizontal. Similarly, the mold clamping unit combined with the horizontal injection unit 300 may be either horizontal or vertical.

(Moving Unit)

In the description of the moving unit 400, as in the description of the injection unit 300, the moving direction of the screw 330 during filling (for example, the negative X-axis direction) is referred to as "forward", and the moving direction of the screw 330 during metering (for example, the positive X-axis direction) is referred to as the "backward".

The moving unit 400 moves the injection unit 300 forward and backward with respect to the mold unit 800. The moving unit 400 also presses the nozzle 320 against the mold unit 800 to produce nozzle touch pressure. The moving unit 400 includes a hydraulic pump 410, a motor 420 as a driving source, a hydraulic cylinder 430 as a hydraulic actuator, etc.

The hydraulic pump 410 has a first port 411 and a second port 412. The hydraulic pump 410 is a pump that can rotate in both directions, and by switching the rotation direction of the motor 420, hydraulic fluid (e.g., oil) is drawn from either one of the first port 411 or the second port 412 and discharged from the other port to generate hydraulic pressure. The hydraulic pump 410 can also suction the hydraulic fluid from a tank and discharge the hydraulic fluid from either the first port 411 or the second port 412.

The motor 420 operates the hydraulic pump 410. The motor 420 drives the hydraulic pump 410 in a rotational direction and by a rotational torque according to a control signal from the control device 700. The motor 420 may be an electric motor or an electric servomotor.

The hydraulic cylinder 430 has a cylinder body 431, a piston 432, and a piston rod 433. The cylinder body 431 is fixed to the injection unit 300. The piston 432 divides the inside of the cylinder body 431 into a front chamber 435 as a first chamber and a rear chamber 436 as a second chamber. The piston rod 433 is fixed to the stationary platen 110.

The front chamber 435 of the hydraulic cylinder 430 is connected to the first port 411 of the hydraulic pump 410 through a first flow path 401. The hydraulic fluid discharged from the first port 411 is supplied to the front chamber 435 through the first flow path 401, and the injection unit 300 is pushed forward. The injection unit 300 is advanced and the nozzle 320 is pressed against the stationary mold 810. The front chamber 435 functions as a pressure chamber that generates the nozzle touch pressure of the nozzle 320 by the pressure of the hydraulic fluid supplied from the hydraulic pump 410.

On the other hand, the rear chamber 436 of the hydraulic cylinder 430 is connected to the second port 412 of the hydraulic pump 410 through a second flow path 402. When the hydraulic fluid discharged from the second port 412 is supplied to the rear chamber 436 of the hydraulic cylinder 430 through the second flow path 402, the injection unit 300 is pushed backward. The injection unit 300 is retracted and the nozzle 320 is separated from the stationary mold 810.

Note that in the present embodiment, the moving unit 400 includes the hydraulic cylinder 430, but the present invention is not limited thereto. For example, instead of the hydraulic cylinder 430, an electric motor and a motion conversion mechanism that converts the rotational motion of the electric motor into the linear motion of the injection unit 300 may be used.

(Control Device)

The control device 700 is configured by, for example, a computer, and includes a CPU (Central Processing Unit) 701, a storage medium 702 such as a memory, an input interface (I/F) 703, and an output I/F 704 as illustrated in FIGS. 1 and 2. The control device 700 performs various control operations by having the CPU 701 execute a program stored in the storage medium 702. Further, the control device 700 receives a signal from the outside by the input I/F 703 and transmits a signal to the outside by the output I/F 704.

The control device 700 repeatedly manufactures a molding product by repeating the metering process, the mold closing process, the pressure-boosting process, the mold clamping process, the filling process, the hold pressure process, the cooling process, the pressure-releasing process, the mold opening process, and the ejection process. The sequence of operations to produce a molding product, for example, from the beginning of the metering process to the beginning of the next metering process, is referred to as a "shot" or a "molding cycle". The time required for one shot is also referred to as the "molding cycle time" or the "cycle time".

One molding cycle includes, for example, a metering process, a mold closing process, a pressure-boosting process, a mold clamping process, a filling process, a hold pressure process, a cooling process, a pressure-releasing process, a mold opening process, and an ejection process, in the stated order. This order is the order of the start of each process. The filling process, the hold pressure process, and the cooling process are performed during the mold clamping process. The start of the mold clamping process may coincide with the start of the filling process. The completion of the pressure-releasing process coincides with the start of the mold opening process.

Multiple processes may be performed simultaneously for the purpose of shortening the molding cycle time. For example, the metering process may be performed during the cooling process of the previous molding cycle or during the mold clamping process. In this case, the mold closing process may be performed at the beginning of the molding cycle. The filling process may also be started during the mold closing process. The ejection process may also be started during the mold opening process. If an opening/closing valve is provided to open and close the flow path of the nozzle 320, the mold opening process may be started during the metering process. This is because even if the mold opening process is started during the metering process, the molding material does not leak from the nozzle 320 if the opening/closing valve closes the flow path of the nozzle 320.

Note that a single molding cycle may include processes other than the metering process, the mold closing process, the pressure-boosting process, the mold clamping process, the filling process, the hold pressure process, the cooling process, the pressure-releasing process, the mold opening process, and the ejection process.

For example, after the completion of the hold pressure process and before the start of the metering process, a pre-metering suck back process may be performed in which the screw 330 is retracted to a preset metering start position. The pressure of the molding material accumulated in front of the screw 330 before the start of the metering process can be reduced and the sudden retreat of the screw 330 at the start of the metering process can be prevented.

After the completion of the metering process and before the start of the filling process, a post-metering suck back process may be performed in which the screw 330 is retracted to a preset filling start position (also referred to as "the injection start position"). The pressure of the molding material accumulated in front of the screw 330 before the start of the filling process can be reduced and the leakage of the molding material from the nozzle 320 before the start of the filling process can be prevented.

The control device 700 is connected to an operation device 750 that receives input operations by the user and a display device 760 that displays a screen. The operation device 750 and the display device 760 are configured by, for example, a touch panel 770 and may be integrated. The touch panel 770, as the display device 760, displays a screen under control by the control device 700. Information such as the settings of the injection molding machine 10 and the current status of the injection molding machine 10 may be displayed on the screen of the touch panel 770. Moreover, in the screen of the touch panel 770, for example, an operation part such as a button or an input field for receiving an input operation by the user may be displayed. The touch panel 770, as the operation device 750, detects an input operation on the screen by the user and outputs a signal corresponding to the input operation to the control device 700. Thus, for example, while confirming the information displayed on the screen, the user can operate the operation part provided on the screen to make settings of the injection molding machine 10 (including input of setting values), etc. When the user operates the operation part provided on the screen, the operation of the injection molding machine 10 corresponding to the operation part can be performed. The operation of the injection molding machine 10 may be, for example, the operation (including stopping) of the mold clamping unit 100, the ejector unit 200, the injection unit 300, the moving unit 400, etc. Further, the operation of the injection molding machine 10 may be, for example, switching the screen displayed on the touch panel 770 as the display device 760.

The operation device 750 and the display device 760 of the present embodiment are described as being integrated as the touch panel 770, but these devices may be provided independently. Further, a plurality of operation devices 750 may be provided. The operation device 750 and the display device 760 are arranged on the operation side (negative Y-axis direction) of the mold clamping unit 100 (more specifically, the stationary platen 110).

(Temperature Control of Molding Material)

Figure 3:
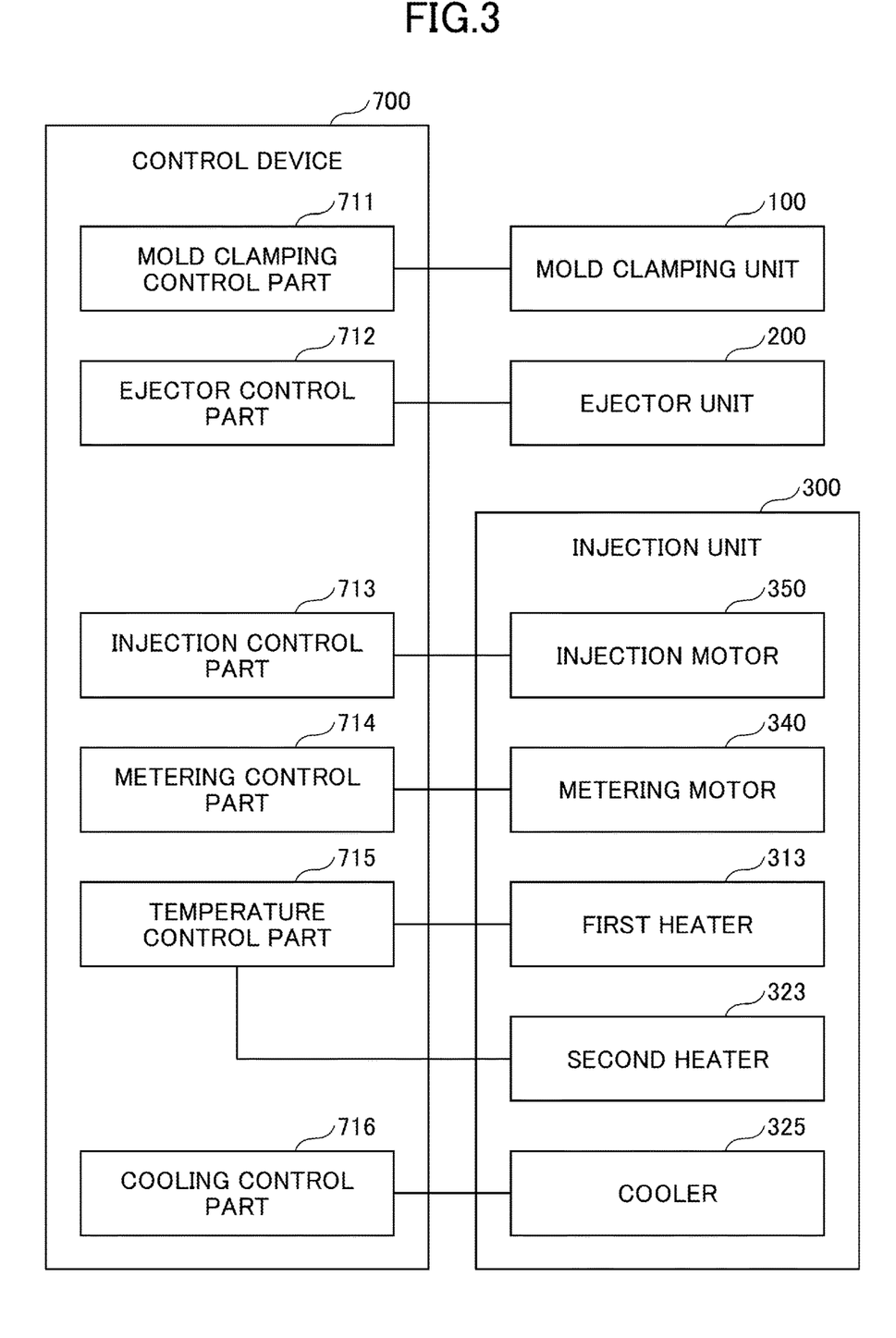
FIG. 3 is a diagram illustrating the elements of a control device in functional blocks.

Next, with reference to FIG. 3, a description is given of an example of the elements of the control device 700. Each functional block illustrated in FIG. 3 is conceptual and does not necessarily need to be physically constructed as illustrated. All or part of each functional block can be functionally or physically distributed and integrated by any unit. All or any part of each processing function performed in each functional block is implemented by a program executed by the CPU. Alternatively, each functional block may be implemented as hardware with wired logic.

The control device 700 includes, for example, a mold clamping control part 711, an ejector control part 712, an injection control part 713, a metering control part 714, a temperature control part 715, and a cooling control part 716.

Figure 4:
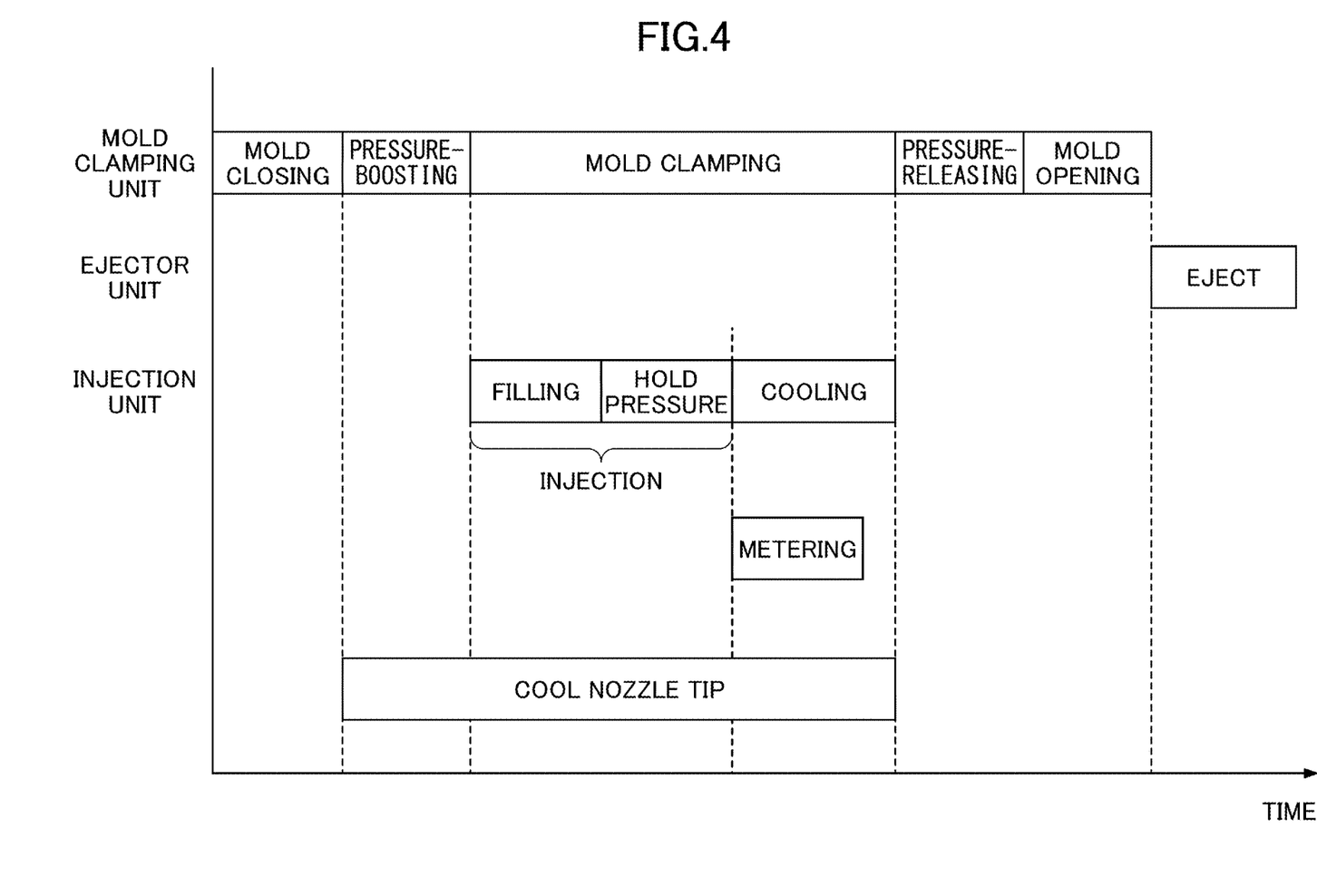
FIG. 4 illustrates an example of the process of a molding cycle.

The mold clamping control part 711 controls the mold clamping unit 100 and performs a mold closing process, a pressure-boosting process, a mold clamping process, a pressure-releasing process, and a mold opening process illustrated in FIG. 4. The ejector control part 712 controls the ejector unit 200 and performs the ejection process. The injection control part 713 controls the injection motor 350 of the injection unit 300 to execute the injection process. The injection process includes a filling process and a hold pressure process. The injection process is carried out during the mold clamping process. The metering control part 714 controls the metering motor 340 of the injection unit 300 to carry out the metering process. The metering process is carried out during the cooling process. Details of the temperature control part 715 and the cooling control part 716 will be described later.

The temperature control part 715 controls the first heater 313 and the second heater 323 of the injection unit 300 to control the temperature of the molding material. An example of the configuration of the injection unit 300 will be described with reference to FIG. 5. The injection unit 300 includes, for example, the cylinder 310, the nozzle 320, the first heater 313, the second heater 323, the screw 330, the metering motor 340, and the injection motor 350.

Figure 5:
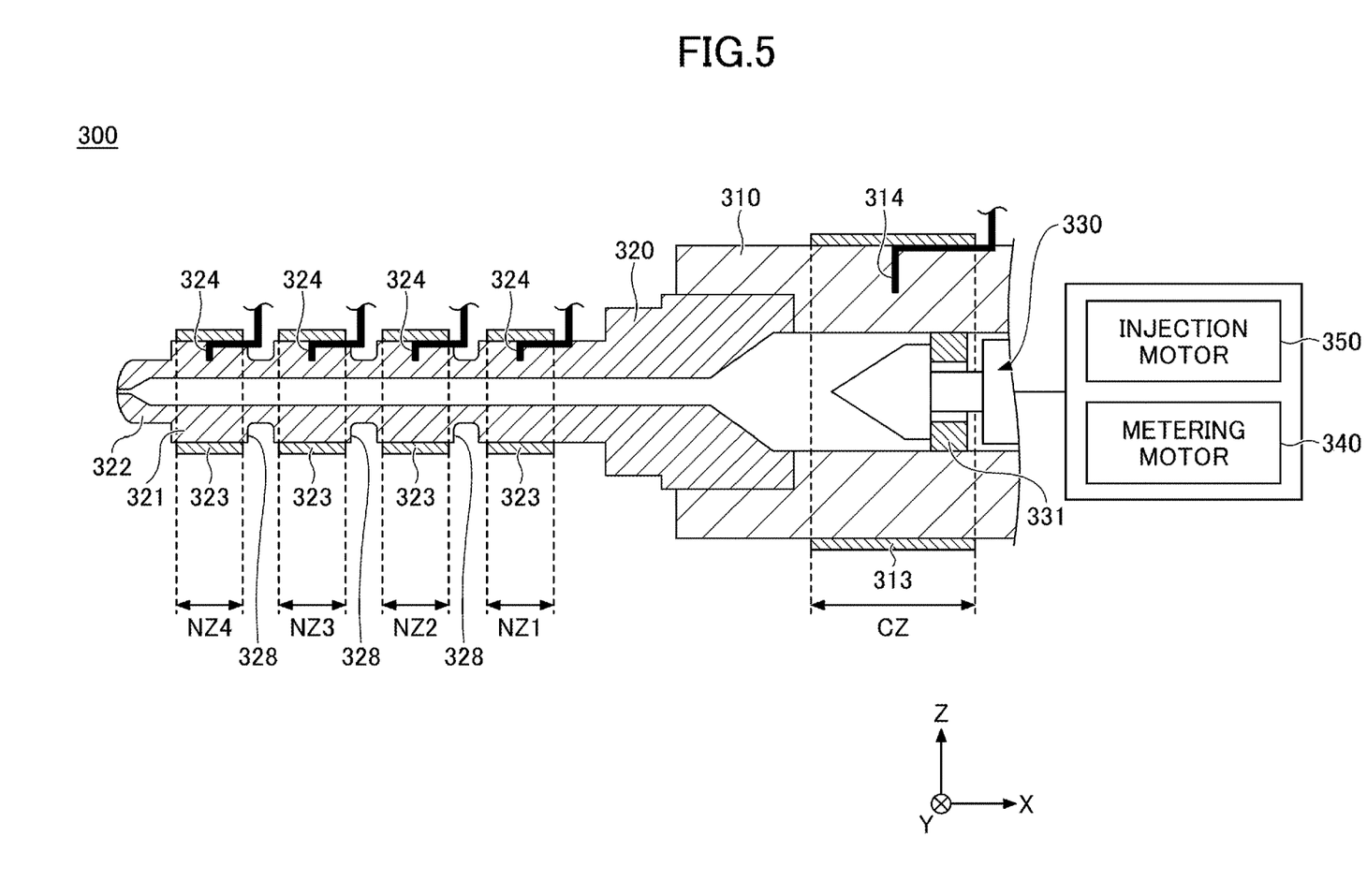
FIG. 5 is a cross-sectional view illustrating an example of a cylinder and a nozzle.

The cylinder 310 includes multiple zones CZ (only one is illustrated in FIG. 5) along the injection direction (e.g., X-axis direction). Each of the zones CZ is provided with the first heater 313 and the first temperature detector 314 to set a set temperature. The temperature control part 715 controls the first heater 313 so that the temperature detected by the first temperature detector 314 becomes the set temperature. The first heater 313 is provided at the outer circumference of the cylinder 310 to heat the cylinder 310.

The nozzle 320 is provided at the tip of the cylinder 310. The nozzle 320 is provided separately from the cylinder 310 and is attached to the cylinder 310. The nozzle 320 may be mounted with respect to the cylinder 310 in a manner as to be replaceable. The nozzle 320 has an outer diameter that is smaller than that of the cylinder 310. Although not illustrated, an adapter for relaying the cylinder 310 and the nozzle 320 may be provided between the cylinder 310 and the nozzle 320. The second heater 323 is provided on the outer periphery of the nozzle 320 to heat the nozzle 320.

The nozzle 320 has multiple zones NZ1 to NZ4 along the injection direction (e.g., X-axis direction). Each of the zones NZ1 to NZ4 is provided with the second heater 323 and the second temperature detector 324 to set a set temperature. Between two adjacent zones (for example, zone NZ1 and zone NZ2), a heat insulating part 328 may be provided to block the transfer of heat between the two zones. The heat insulating part 328 includes, for example, a groove. The temperature control part 715 controls the second heater 323 so that the temperature detected by the second temperature detector 324 becomes the set temperature. As described later, the number of the second heaters 323 may be one.

The nozzle 320 includes, for example, a nozzle body 321 provided with the second heater 323, and a nozzle tip 322 provided at the tip of the nozzle body 321. Multiple second heaters 323 may be provided at intervals in the injection direction on the outer periphery of the nozzle body 321. Further, the heat insulating part 328 may be provided between the multiple second heaters 323. The nozzle tip 322 has an outer diameter that is smaller than that of the nozzle body 321. The nozzle tip 322 touches the mold unit 800 and injects the molding material into the mold unit 800.

The screw 330 is an injection member for injecting, from the nozzle 320, the molding material inside the cylinder 310 and the nozzle 320. The injection member is not limited to the screw 330 and may be, for example, a plunger. The injection member is provided inside the cylinder 310 so as to be capable of moving forward and backward. The molten molding material is stored in front of the injection member.

The injection motor 350 is a driving source that moves the injection member forward and backward. For example, the injection motor 350 advances the screw 330 to inject, from the nozzle 320, the molten molding material that is stored in front of the screw 330. The driving source for moving the injection member forward and backward is not limited to the injection motor 350 and may be, for example, a hydraulic cylinder.

Figure 7:
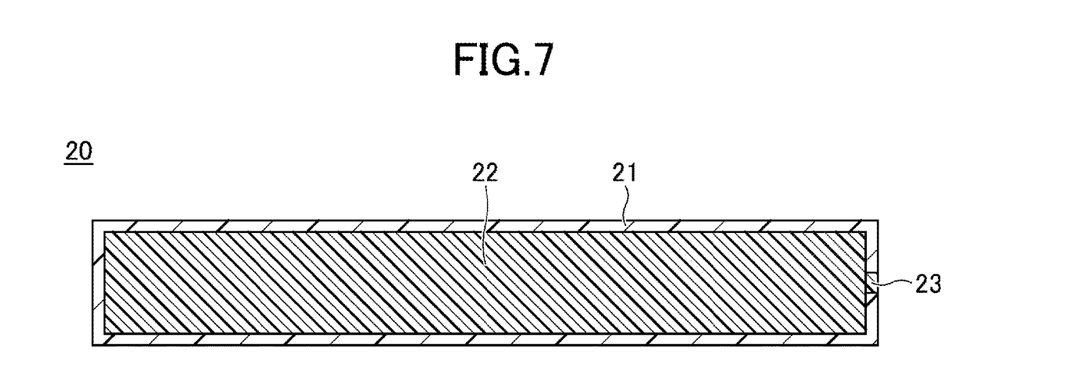
FIG. 7 is a cross-sectional view illustrating an example of a molding product.

The injection unit 300 fills the cavity space 801 (see FIG. 2) of the mold unit 800 with molten molding material and solidifies the filled molding material to produce a molding product 20 (see FIG. 7). The shape and dimensions of the molding product 20 are determined by the shape and dimensions of the cavity space 801. It is possible to change the dimensions and shape of the molding product 20 by replacing the mold unit 800.

The molding material flows into the interior of the cavity space 801 from the inlet of the cavity space 801, and is cooled from where the molding material contacts the wall surface of the cavity space 801 to form, for example, a skin layer 21. The thickness of the skin layer 21 is, for example, 0.05 mm to 1 mm. The thickness of the skin layer 21 is measured, for example, by cross-section observation by using an optical microscope.

The molding material forms a core layer 22 which is filled inside the skin layer 21 while forming the skin layer 21. After the cavity space 801 is filled with the molding material, a seal layer 23 is formed to block the inlet of the cavity space 801. As a result, the molding product 20 including the skin layer 21, the core layer 22, and the seal layer 23, is formed.

Conventionally, when the heating temperature of the nozzle 320 is set low, there have been problems that the fluidity of the molding material is degraded, and the filling property of the molding material with respect to the mold unit 800 and the transfer property of the shape from the mold unit 800 to the molding product 20 are degraded. On the other hand, when the heating temperature of the nozzle 320 is set high, there has been a problem that it takes a long time to solidify the molten molding material, which increases the molding cycle time.

The temperature control part 715 controls the temperature of the molding material used to form the skin layer 21 to be higher than the temperature of the molding material used to form the core layer 22, at the start of the injection process. The molding material used to form the skin layer 21 flows into the cavity space 801 earlier than the molding material used to form the core layer 22, and is thus located ahead in the injection direction (negative X-axis direction). At the start of the injection process, the molding material used to form the skin layer 21 is contained in the nozzle 320 and the molding material used to form the core layer 22 is contained in the cylinder 310.

Figure 6:
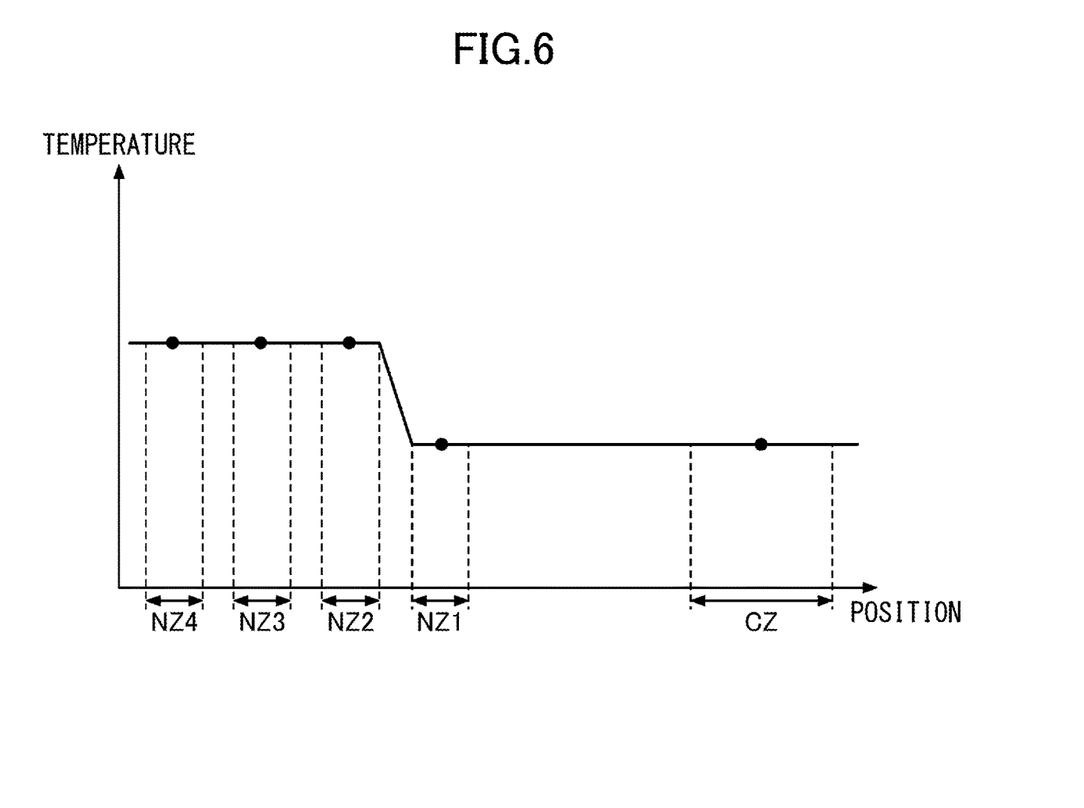
FIG. 6 illustrates an example of the temperature distribution in FIG. 5.

The temperature control part 715 controls the temperature of at least a part of the molding material in the nozzle 320 to be higher than the temperature of the molding material in the cylinder 310, at the start of the injection process, for example. Specifically, for example, as illustrated in FIG. 6, the temperature control part 715 controls the temperature of at least some of the second heaters 323 (temperature in zones NZ2, NZ3 and NZ4, for example) to be higher than the temperature of the first heater 313 (e.g., the temperature of the zone CZ).

When multiple first heaters 313 are provided in the axial direction of the cylinder 310, the temperature of at least some of the second heaters 323 is controlled to be higher than the temperature of the first heater 313 closest to the nozzle 320 among the multiple first heaters 313. For the two adjacent second heaters 323, the temperature of the second heater 323 that is ahead in the injection direction (the negative X-axis direction) is controlled to be higher than the temperature of the second heater 323 that is behind the injection direction (the positive X-axis direction) (see FIG. 6).

As described above, the temperature control part 715 controls the temperature of the molding material used to form the skin layer 21 to be relatively high at the start of the injection process. The temperature of the molding material used to form the skin layer 21 at the start of the injection process is, for example, greater than or equal to (Tg+100)° C. and less than or equal to (Tg+200)° C. Here, Tg is the glass transition point of the resin that is the molding material. Therefore, the temperature of at least some of the second heaters 323 is, for example, greater than or equal to (Tg+100)° C. and less than or equal to (Tg+200)° C. The higher the temperature of the molding material used to form the skin layer 21, the smoother the flow of the molding material along the wall of the cavity space 801. Therefore, it is possible to improve the filling property of the molding material with respect to the mold unit 800 and the transfer property of the shape from the mold unit 800 to the molding product 20.

As described above, the temperature control part 715 controls the temperature of the molding material used to form the core layer 22 to be low at the start of the injection process. The temperature of the molding material used to form the core layer 22 at the start of the injection process is, for example, greater than or equal to (Tg+60)° C. and less than or equal to (Tg+130)° C. Therefore, the temperature of the first heater 313 closest to the nozzle 320 is, for example, greater than or equal to (Tg+60)° C. and less than or equal to (Tg+130)° C. The lower the temperature of the molding material, the faster the molding material solidifies. Therefore, the molding cycle time can be shortened.

When the temperature control part 715 sets the temperature of at least some of the second heaters 323 to be higher than the temperature of the first heater 313, the temperature of the first heater 313 can be set lower than the conventional temperature, and the power consumed by the first heater 313 and the second heater 323 can be reduced. The ratio of the power consumed by the first heater 313 and the second heater 323 to the power consumed by the entire injection molding machine 10 is high, for example, 40% to 80%.

Therefore, by reducing the power consumed by the first heater 313 and the second heater 323, the power consumed by the entire injection molding machine 10 can be sufficiently reduced.

The temperature control part 715 may change the volume of the molding material in the nozzle 320, which is controlled to be higher than the temperature of the molding material in the cylinder 310 at the start of the injection process, according to the volume of the skin layer 21. The volume of the skin layer 21 is determined by the shape and dimensions of the cavity space 801 of the mold unit 800, and more specifically by the shape and dimensions of the wall surface of the cavity space 801. This makes it possible to enable the replacement of the mold unit 800.

For example, when multiple second heaters 323 are provided along the injection direction as illustrated in FIG. 5, the temperature control part 715 changes the number of second heaters 323 to be controlled to a temperature higher than that of the first heater 313, according to the volume of the skin layer 21. The temperature control part 715 changes the number of zones, among zones NZ1 to NZ4, having a higher temperature than the temperature of the zone CZ, according to the volume of the skin layer 21. The larger the volume of the skin layer 21, the more the number of zones having a high temperature.

Figure 8A:
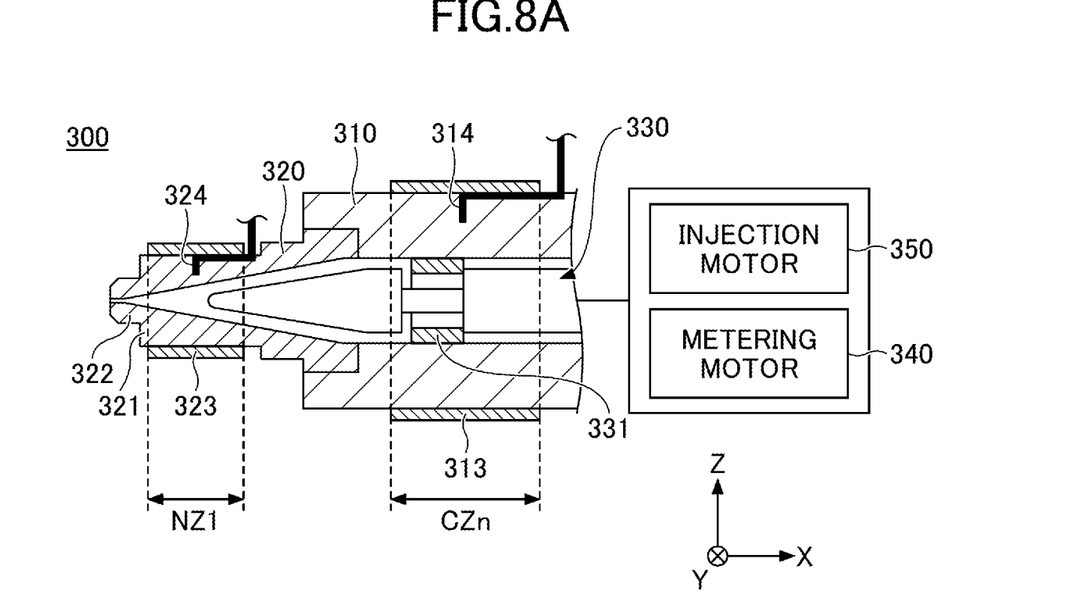
FIG. 8A is a cross-sectional view illustrating an example of a screw position at the completion time of injection.
Figure 8B:
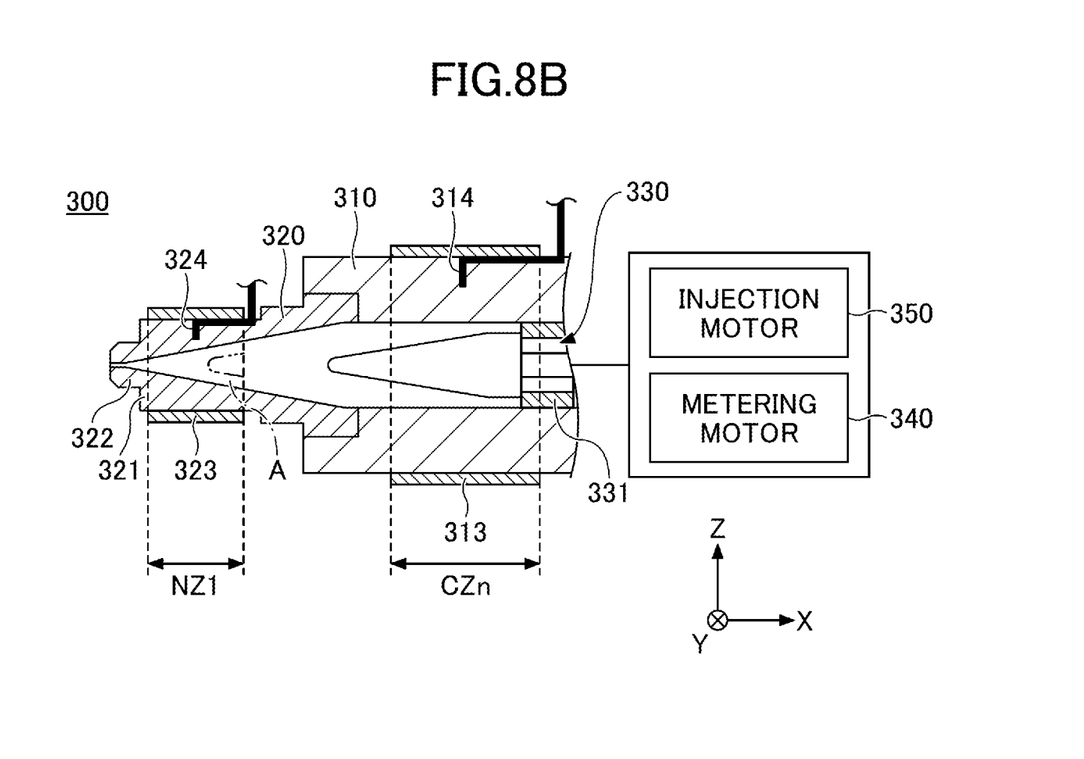
FIG. 8B is a cross-sectional view illustrating an example of a screw position at the completion time of metering.
Figure 9:
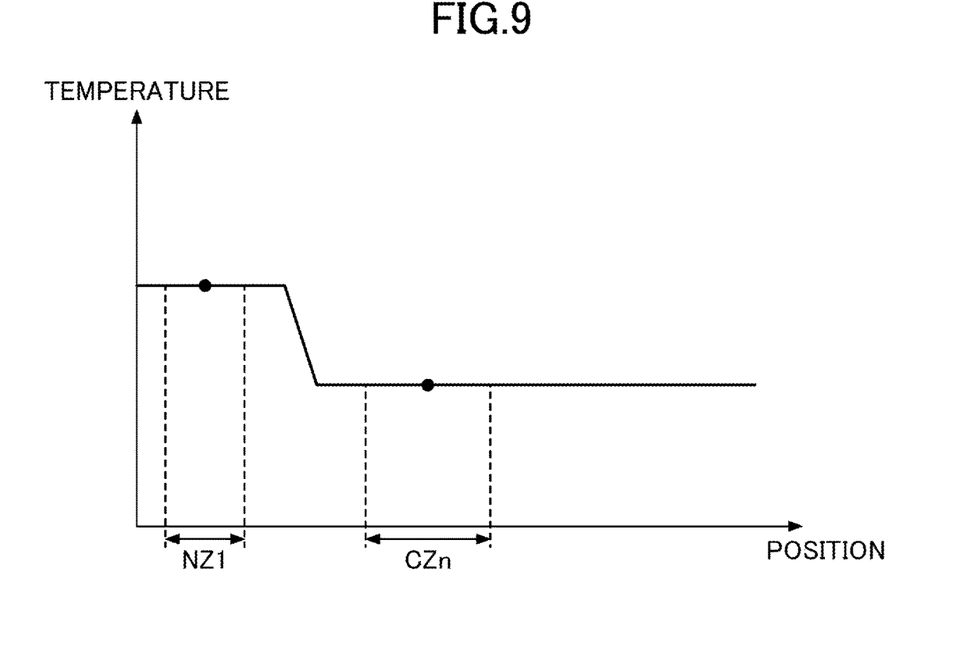
FIG. 9 illustrates an example of the temperature distribution in FIGS. 8A and 8B.

Next, a modification example of the injection unit 300 will be described with reference to FIGS. 8A, 8B, and 9. As illustrated in FIGS. 8A and 8B, the number of the second heaters 323 may be one. Again, as illustrated in FIG. 9, the temperature control part 715 controls the temperature of the second heater 323 (e.g., the temperature of zone NZ1) to be higher than the temperature of the first heater 313 (e.g., the temperature of zone CZ).

The injection control part 713 may control the volume of the molding material in the nozzle 320 that is controlled to have a higher temperature than the temperature of the molding material in the cylinder 310, by controlling the position of the screw 330 inserted into the nozzle 320 at the time of the completion of the injection process as illustrated in FIG. 8A.

As illustrated in FIG. 8A, at the time of the completion of the injection process, the tip of the screw 330 is inserted into zone NZ1, which is heated to a temperature higher than that of the zone CZ. Then, by the time of the completion of the metering process as illustrated in FIG. 8B, the tip of the screw 330 is pulled out from the zone NZ1.

In FIG. 8B, area A is part of zone NZ1 and is the area where the tip of the screw 330 is pulled out from and where the molding material flows into instead of the screw 330, from the completion of the injection process to the completion of the metering process. A relatively cold molding material flows into area A. If the molding cycle time is short, the temperature of the molding material in area A will remain cold at the start of the next injection process.

Therefore, by controlling the position of the screw 330 inserted into the nozzle 320 at the time of the completion of the injection process, it is possible to control the volume of the molding material in the nozzle 320 that is controlled to have a higher temperature than the temperature of the molding material in the cylinder 310 at the start of the next injection process. This control operation is also applicable when the number of second heaters 323 is more than one.

The injection control part 713 may change the position of the screw 330 inserted into the nozzle 320 at the time of the completion of the injection process, according to the volume of the skin layer 21. This makes it possible to enable the replacement of the mold unit 800. Replacing the mold unit 800 changes the shape and dimensions of the cavity space 801 and changes the volume of the skin layer 21.

Figure 10:
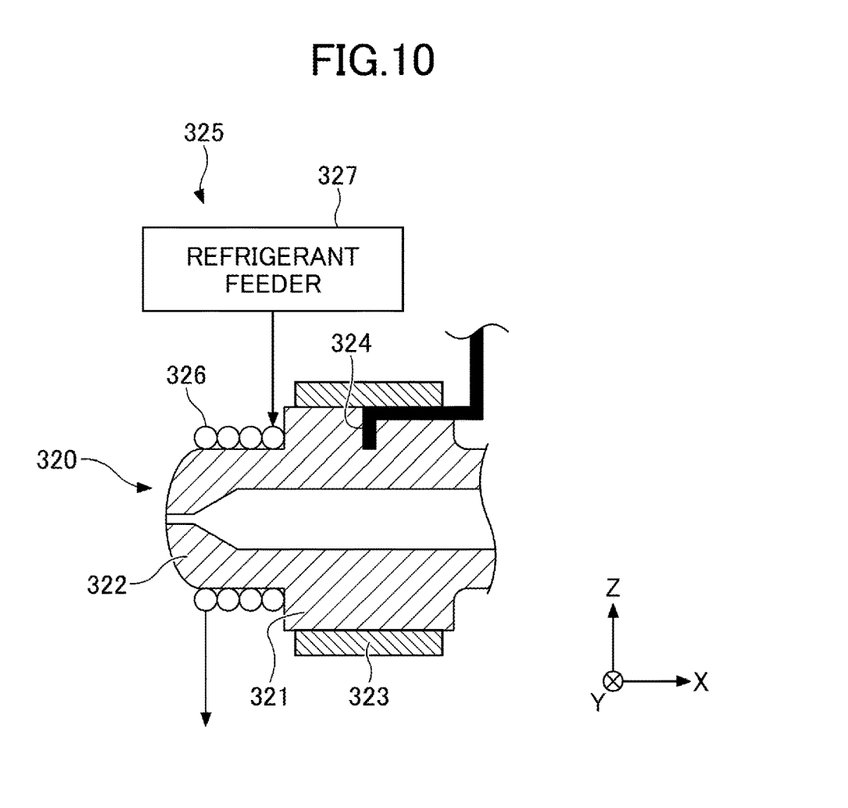
FIG. 10 is a cross-sectional view illustrating an example of a cooler that cools the nozzle tip.

Next, an example of the cooling control part 716 illustrated in FIG. 3 will be described with reference to FIG. 4 and FIG. 10. The cooling control part 716 controls a cooler 325 to cool the tip of the nozzle 320. The cooler 325 is provided at the tip of the nozzle 320, specifically at the outer circumference of the nozzle tip 322, for example, as illustrated in FIG. 10.

The cooler 325 has, for example, a cooling pipe 326 and a refrigerant feeder 327 that feeds a refrigerant to the cooling pipe 326. As the refrigerant, gas such as air or a liquid such as water is used. The cooling pipe 326 is wound in the shape of a coil around the periphery of the nozzle tip 322, but may be formed to have a cylindrical shape along the injection direction.

The refrigerant feeder 327 feeds the refrigerant adjusted to a predetermined temperature to the cooling pipe 326 under the control of the cooling control part 716. The refrigerant cools the nozzle tip 322 by absorbing heat from the nozzle tip 322 while flowing through the cooling pipe 326. The refrigerant feeder 327 starts cooling the nozzle tip 322 by starting to feed the refrigerant to the cooling pipe 326. The refrigerant feeder 327 stops the cooling of the nozzle tip 322 by stopping the feed of the refrigerant to the cooling pipe 326.

Note that the cooler 325 may include a Peltier element and an electric current supplier instead of the cooling pipe 326 and the refrigerant feeder 327. The electric current supplier starts to cool the nozzle tip 322 by starting to supply current to the Peltier element. The electric current supplier stops the cooling of the nozzle tip 322 by stopping the supply of current to the Peltier element. The Peltier element can also heat the nozzle tip 322 by reversing the direction of the current.

The cooler 325 cools the nozzle tip 322 at the start of the mold opening process to such an extent that, a phenomenon that is referred to as "threading", can be prevented. Threading is a phenomenon in which the molding material, which has not been completely solidified at the boundary between the nozzle tip 322 and the mold unit 800, is stretched in a threadlike manner by opening the mold. Threading can result in a poor appearance of the molding product 20 or damage to the mold unit 800.

If the cooler 325 continues to cool the nozzle tip 322 during the molding cycle, the temperature of the molding material in the nozzle body 321 will drop at the start of the injection process. Therefore, the cooling control part 716 may cool the tip of the nozzle 320 only in part of the molding cycle as illustrated in FIG. 4.

The cooling control part 716 starts cooling the nozzle tip prior to the start of the mold opening process, in order to cool the nozzle tip 322 enough to prevent a phenomenon that is referred to as threading at the start of the mold opening process. The timing of starting the cooling the nozzle tip is, for example, between the start of the mold closing process and the start of the injection process.

Further, the cooling control part 716 stops cooling the nozzle tip at a desired timing to increase the temperature of the molding material in the nozzle body 321 at the start of the next injection process. The timing of stopping the cooling of the nozzle tip is, for example, between the time of the completion of the injection process and the time of the completion of the mold opening process, and preferably between the time of the completion of the injection process and at the start of the mold opening process.

According to one aspect of the present invention, the filling property and the transfer property can be improved by controlling the temperature of the molding material used to form the skin layer to be relatively high at the start of the injection process, and the molding cycle time can be shortened by controlling the temperature of the molding material used to form the core layer to be relatively low at the start of the injection process. Therefore, the improvement of the filling property and the transfer property, as well as the reduction of the molding cycle time, can be achieved.

As described above, an embodiment of the control method of the injection molding machine and the control device of the injection molding machine according to the present invention has been described, but the present invention is not limited to the above-mentioned embodiment. Various changes, modifications, substitutions, additions, deletions, and combinations are possible within the scope of the claims. These modifications, etc., are also included in the technical scope of the present invention.

What is claimed is:

1. A control device of an injection molding machine that molds a molding product including a skin layer and a core layer in a mold unit by injecting a molding material to the mold unit from a nozzle, the control device comprising:
a temperature control part configured to control at least one heater provided separately from the mold unit and attached to a cylinder of the injection molding machine, and using the at least one heater to control a first temperature of the skin layer and a second temperature of the core layer, wherein the molding material forms the core layer which is filled inside the skin layer while forming the skin layer, and the molding material that forms the core layer and the skin layer is the same.

2. A control device of an injection molding machine, the injection molding machine including a cylinder, a nozzle provided at a tip of the cylinder, a first heater configured to heat the cylinder, and a second heater configured to heat the nozzle, the injection molding machine being configured to mold a molding product including a skin layer and a core layer in a mold unit by injecting a molding material to the mold unit from the nozzle, the control device comprising:
a temperature control part configured to control a temperature of at least part of the second heater so as to be higher than a temperature of the first heater, both of the first heater and the second heater being provided separately from the mold unit and attached to the cylinder of the injection molding machine, and a first temperature of the skin layer and a second temperature of the core layer, wherein the molding material forms the core layer which is filled inside the skin layer while forming the skin layer, and the molding material that forms the core layer and the skin layer is the same.

3. The control device of the injection molding machine according to claim 2, the control device comprising:
an injection control part configured to control a position of an injection member that is inserted into the nozzle at a completion time of an injection process.

4. The control device of the injection molding machine according to claim 2, the control device comprising:
a cooling control part configured to control a cooler provided at a tip of the nozzle, wherein
the cooling control part cools the tip of the nozzle such that the cooling starts prior to a mold closing process and stops the cooling before an injection process.

5. The control device of the injection molding machine according to claim 1, wherein the cylinder is movable and heats the molding material by heat from the cylinder while being sent forward into the mold unit using the at least one heater attached to the cylinder.

6. The control device of the injection molding machine according to claim 2, wherein the cylinder is movable and heats the molding material by heat from the cylinder while being sent forward into the mold unit using at least one of the first heater and the second heater attached to the cylinder.

* * * * *